May 17, 1932.    E. E. WINKLEY    1,858,654
SPEED CONTROL MECHANISM
Original Filed Aug. 16, 1924    2 Sheets-Sheet 1
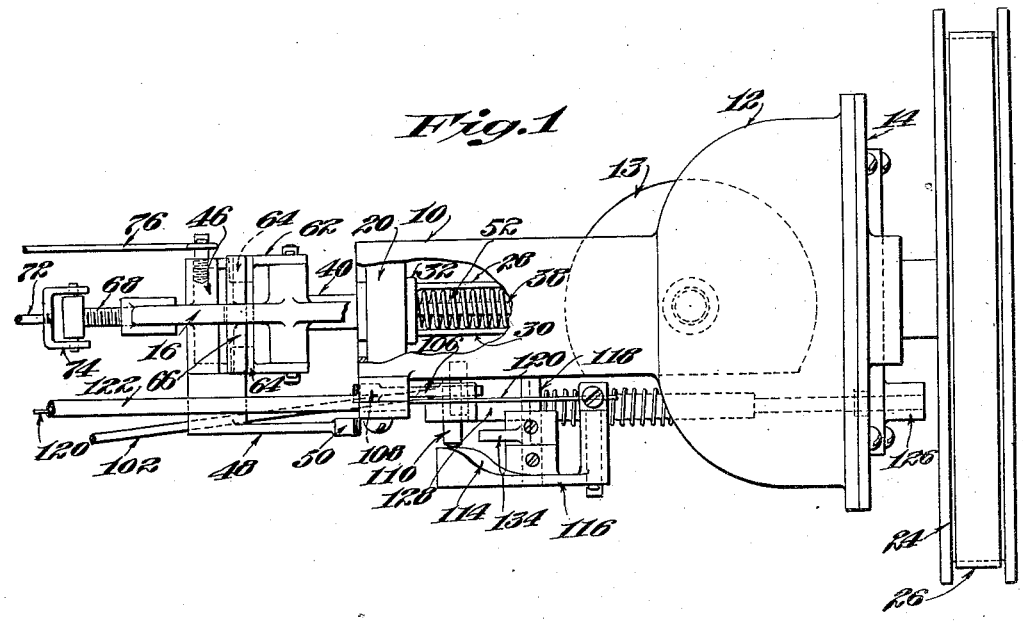
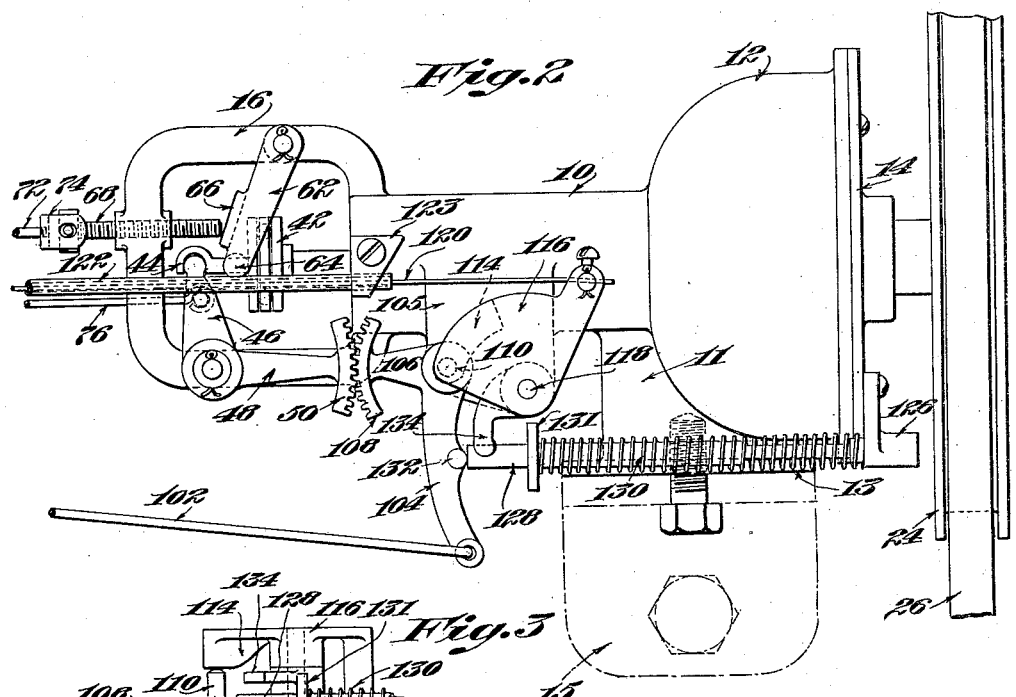
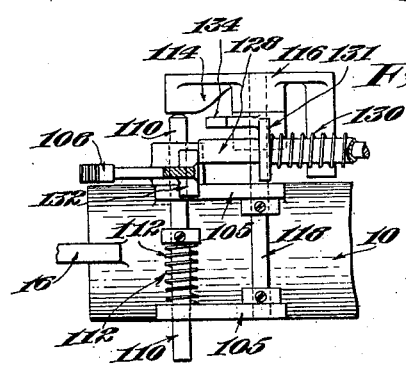
Inventor
Erastus E. Winkley
by his attorney
Warren G. Ogden May 17, 1932.  E. E. WINKLEY  1,858,654
SPEED CONTROL MECHANISM
Original Filed Aug. 16, 1924  2 Sheets-Sheet 2
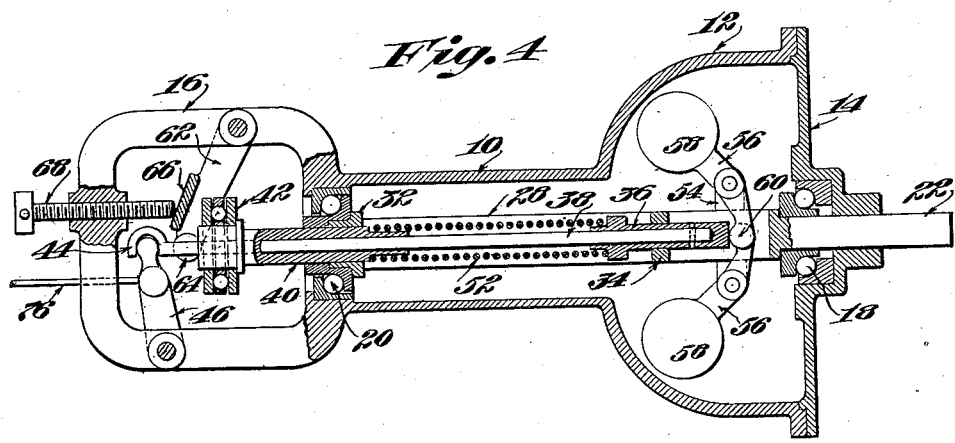
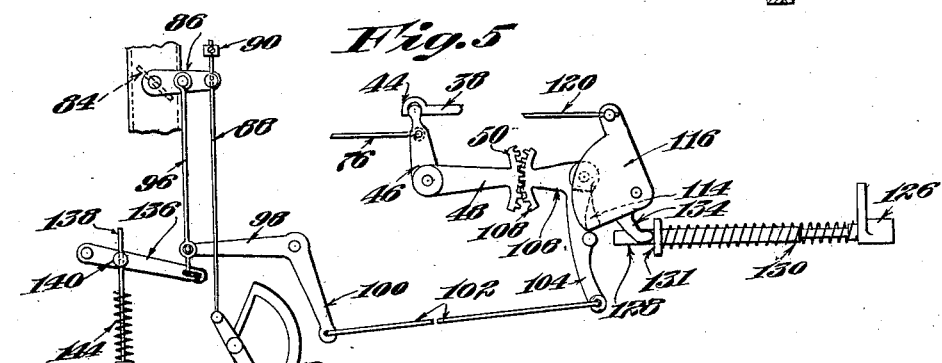
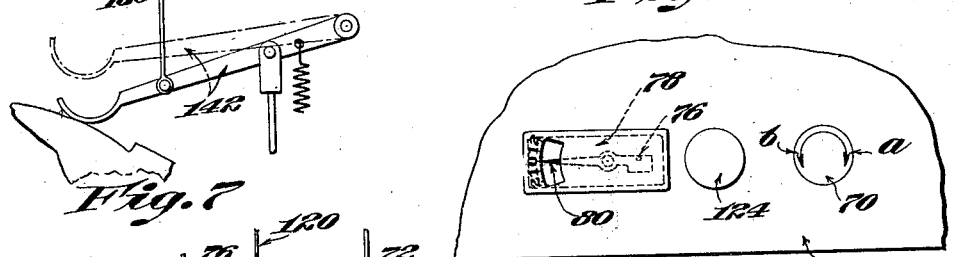
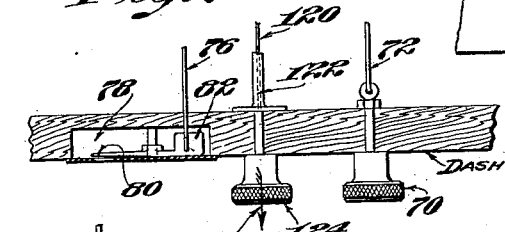
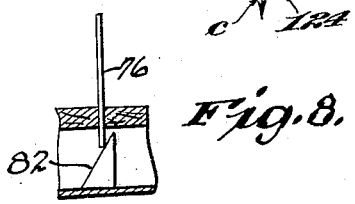
Inventor
Erastus E. Winkley
by his attorney
Warren G. Ogden Patented May 17, 1932

1,858,654

UNITED STATES PATENT OFFICE

ERASTUS E. WINKLEY, OF LYNN, MASSACHUSETTS

SPEED CONTROL MECHANISM

Application filed August 16, 1924, Serial No. 732,586. Renewed November 28, 1928.

This invention relates to mechanisms for maintaining a substantially fixed, predetermined rate of speed in a power-driven moving vehicle, as an automobile, regardless of a change in gradient of the road travelled or other factors or conditions to be met with during travel which vary the load on the engine. It will be understood from the following description that, in its broader aspects, the invention may be utilized to control other power plants than the engine of an automobile.

The principal object of the invention is to provide speed control mechanism which, after a desired rate of speed has initially been attained, may be so adjusted or balanced by the operator that on encountering variations in load conditions tending to increase or decrease the rate of speed and thus unbalance the mechanism, it will automatically overcome the disturbing factor and maintain the selected rate of speed under the new conditions.

To the accomplishment of this object and such others as may hereinafter appear, as will readily be apparent to those skilled in the art from the following description, the invention comprises the features and combinations of parts hereinafter described and then particularly pointed out in the appended claims.

The preferred form of the invention is illustrated in the accompanying drawings, in which Figure 1 is a view, in plan, of the embodiment of the invention as an automobile accessory designed to be mounted above the engine at the forward end thereof so that it may conveniently receive its motive power from the shaft which drives the cooling fan;

Fig. 2 is a view, in side elevation, of the mechanism shown by Fig. 1;

Fig. 3 is an underside view, of the cam and co-operating parts for locking the mechanism in balance. In Figs. 1 to 3 the locking gear segments are not in mesh;

Fig. 4 is a view, in elevation and partial longitudinal section showing chiefly the centrifugal governor unit which forms part of the controlling mechanism;

Fig. 5 is a diagrammatic view illustrating the control of the carbureter valve automatically through the action of the novel accessory mechanism; through the throttle lever; and through the brake lever. In this view the locking gear segments are enmeshed;

Fig. 6 illustrates a section of the dash of an automobile fitted with the control for the new mechanism;

Fig. 7 is a view, in section, of the section of the dash shown by Fig. 6, and

Fig. 8 is a sectional view through the dash showing the relation of the indicator and the rod which operates it.

In the embodiment of the invention illustrated in the drawings the accessory mechanism comprises an enclosed casing having a central tubular portion 10, a forward semi-spherical governor casing 12 closed by a face plate 14, and a rear rectangular frame or yoke 16. A ball bearing 18 of accepted type is provided centrally of the face plate 14 and a similar ball bearing 20 is provided at the rear end of the tube 10. These bearings support a central governor shaft having a solid, forward projecting end 22 for receiving a pulley 24 driven by a belt 26 from any moving part of the engine that will secure a rate of speed of the shaft 22 directly proportional to the rate of speed of the engine.

The casing is provided with a vertical web 11 (Fig. 2) having a horizontal base 13 through which it can be bolted to a bracket 15 (indicated by dot and dash lines) secured to the engine frame.

The solid portion 22 of the governor shaft extends to just within the bearing 18, Fig. 4, and from thence to the bearing 20 it comprises two spaced bars 28 and 30 which are connected by a gland 32 at the bearing and by a tie plate 34 within the governor housing. The tie plate is bored centrally to receive, with a sliding fit, a housing 36 in which is secured the forward end of a rod 38. The rear end of this rod extends, with a sliding fit, through a housing 40 adapted to slide within the bearing 20 and carrying a thrust bearing 42 located inside the yoke 16. The governor rod 38 extends beyond the housing 40 and is provided with a semi-circular hook 44 forming one part of an articular connection to the upper, rounded end of the vertical arm 46 of a bell-crank fulcrumed on the lower bar of yoke 16. The horizontal arm 48 of this bell-crank carries a vertically arranged, toothed segment 50 forming a part of the locking device for maintaining the mechanism in balance as will presently be described.

The housings 36 and 40 are each provided with a circumferential shoulder against which bear the forward and rear ends, respectively, of a coil spring 52 surrounding the rod 38. Forward of the housing 36 the central shaft is provided with a cross frame 54 to the ends of which are pivoted the two levers 56 of the governor carrying the governor weights 58 at their outer ends and rounded nubs 60 at their inner ends. The forward end of the rod housing 36 is maintained in contact with the nubs 60 by the spring 52. The shaft 22, weights 58, rod 38 and spring 52 constitute the chief elements of the governor unit which is used to control the throttle valve automatically. The tension of the spring 52 may be varied in accordance with the rate of speed to be maintained, and whenever the centrifugal force equals the centripetal force on the weights the radius of gyration of the weights will be constant for that speed. Thus by adjustment of two connected, depending arms 62 fulcrumed in a long bearing (Fig. 1) on the upper bar of yoke 16 each of which has a bearing point 64 (Figs. 1 and 4) at the rear side of the thrust bearing 42 the radius of gyration, or position of balance, of the weights for a given speed is changed. A cross brace 66 connects the two arms and the yoke thus formed is moved forward by advancing a screw 68 threaded, say by a right hand thread, through the rear bar of yoke 16. The screw 68 is adjusted by rotating a button 70 (Figs. 6 and 7) on the dash and connected to the head of the screw by a wire 72 leading to a yoked head connection 74 (Figs. 1 and 2). On rotating the button 70 to the right (arrow $a$ Fig. 6) the screw 68 is advanced and, assuming that the position of the governor nubs 60 is fixed, consequently the housing 40 is slid forward on the rod 38 thus increasing the tension of the spring 52. On turning the button to the left (arrow $b$ Fig. 6) the screw is withdrawn and the housing 40 is slid rearward on the rod by expansion of the spring. This adjustment functions to bring the strength of the spring 52 into equality with the thrust of the governor on the housing 36, whatever angular position the governor weights may assume due to varying rates of speed of the automobile.

After the automobile has attained the rate of speed it is desired to maintain, the screw 68 is adjusted to change the position of balance of the governor unit, to give the desired valve opening to maintain that speed, so that any variation of the governor weights to either side of this position will instantly be communicated to the toothed segment 50 by a corresponding longitudinal movement of the rod 38 within the tie plate 34 and housing 40. In order to give a visual indication of the position of the arm 46 which controls the valve 84 a rod or wire 76 extends rearward from the bell-crank arm 46 and into a recess 78 (Fig. 7) in the dash. A needle (Fig. 6) is pivoted within the recess on a horizontal pin one end 80 of the needle moving past a sight opening and the other end being provided with a beveled surface 82 on which the rear end of the rod 76 bears, see Fig. 8. An advance or withdrawal of the rod across the cam surface 82 will move the needle either up or down past zero on the scale opposite the sight opening. The button 70 is turned sufficiently in the direction required, to bring the bell-crank arm 46 to such an angular position that the needle registers zero. In this position, on the scale, selected arbitrarily, the needle when at rest indicates that the governor unit is in a position of balance such that the desired valve opening, wanted, is acquired.

According to the present invention the automobile is now given over to the control of the balanced governor unit, a connection being made by virtue of which a greater load on the engine will operate to supply more gas and a lessening of the load will operate to decrease the supply of gas until the normal condition under which the governor unit was first balanced is restored. These, and the related mechanisms will now be explained.

Referring to the diagram of Fig. 5, 84 indicates the carburetor valve in the manifold, operated by an arm 86. A rod 88 slides freely through a rotary lug at the outer end of arm 86 and has an adjustable collar 90 on one end. The other end of this rod is connected to the throttle lever 92 pivoted on the segment 94 as usual. The valve 84 is shown as having been opened half-way by a commensurate movement of the throttle 92 and then, after performing certain operations to be described presently, the throttle was moved back to its zero position, as shown, which has withdrawn the collar 90 from contact with the valve operating arm 86. The movement of arm 86 in opening valve 84 has depressed a rod 96 which connects the arm to the horizontal arm 98 of a bell-crank lever fulcrumed at a convenient point on the engine frame. The vertical arm 100 of this bell-crank is consequently given a forward movement and, through the agency of a connecting rod, or wire 102, the vertical arm 104 of a bell-crank fulcrumed in plates 105 depending from the casing tube 10, is also given a forward movement. This movement is communicated to the horizontal arm 106 of this bell-crank and to a toothed segment 108 carried thereby, the teeth of which are adapted to mesh with the teeth of the segment 50 the position of which is simultaneously determined by the angular movement of the governor weights as heretofore described.

It will be seen from Fig. 1 that at this time the two segments lie in different vertical planes and each is free to be moved without affecting the other. They are adapted to be enmeshed, and when so connected any change of condition in the train of mechanism through which one is controlled necessarily causes a simultaneous change in the train of mechanism through which the other is controlled. The means for enmeshing the two segments will now be described, this hooking together of the two mechanisms taking place prior to a return of the throttle lever 92 to its zero position.

The fulcrum of the bell crank 104—106 comprises a pin 110 which is continuously urged outward, to place segment 108 in the plane of segment 50, through its bearings in the plates 105 by a suitably mounted spring 112 (see Fig. 3). This pressure is resisted by a cam 114, on a rotary cam plate 116, designed to keep the two segments out of mesh so long as the cam plate retains its angular position shown in Figs. 1 and 2. The pivot on which cam plate 116 turns is a shaft 118 journaled in the plates 105. Cam plate 116 has an ear to which is connected a rod or wire 120 which extends to the dash within a protecting tube 122 held to the casing 10 by a clamp 123. At the dash the rod 120 terminates in a button 124 (Fig. 7) and on pulling out this button (see arrow c) the cam plate is turned to the position shown in Fig. 5, removing cam 114 from the end of pin 110 and permitting spring 112 to move the segment 108 outward into mesh with the segment 50. The collar (see Fig. 3) holding spring 112 is so set on the pin as to accurately limit the outward movement of segment 108.

The face plate 14 carries a socket 126 which receives the solid unit of a telescopic rod 128 that is continuously extended by a coiled expansion spring 130 confined between the socket and a flange 131 on the tubular unit. The rear end of rod 128 seats against a widened lug 132 on the vertical arm 104 of bell-crank 104—106 and in opening the carbureter valve by the throttle the force of spring 130, which is a throttle closing spring, must be overcome. It is essential that the two gear segments 50 and 108 be free of all restraint, except from each other, after they have been enmeshed since otherwise changes from the balanced condition of the governor unit would not be freely transmitted to the throttle valve. To this end the cam plate shaft 118 has secured thereto a collar carrying a depending finger 134 which, when the cam plate is rotated to the position of Fig. 5, engages the flange 131 and retracts the rod 128 from its engagement with lug 132. This withdrawal, when augmented by the subsequent withdrawal of the collar 90 on the throttle rod from the valve arm 86, leaves the entire train, from the governor unit to the carbureter valve, free of restraint.

It will be understood from the foregoing that with the automobile under control of the mechanism thus far described, the gas supply cannot be reduced by a movement of the throttle lever. Provision for closing the throttle valve, irrespective of the relation to each other of the segments 50 and 108, is made in the following manner. The rod 96 has an extension which connects for sliding movement in a slot at one end of an arm 136 (Fig. 5), that is pivoted by its other end in a position to receive the forward end of a rod 138, with a sliding fit through a rotary lug 140, the rear end of which is connected to the foot brake lever 142 above its pivot. A collar is secured to rod 138 and a coiled spring 144 is interposed between this collar and the arm 136. It will be observed that the length of this spring is such that when the brake is off, as in Fig. 5, its forward end does not contact with the arm 136. Freedom of movement of the parts under control of the governor unit is thus preserved. The design is such that in applying the brake the first part of the movement of lever 142 (to the dotted line position of Fig. 5) will first cause the rod 138 to slide through the lug 140 on the arm 136 until the spring engages the arm, and the arm and rod 96 are thereafter moved in a direction to partially, or completely, close the carbureter valve according to the degree of the movement imparted to the brake lever. If the brake lever movement is continued, to apply the brake, then the valve is first wholly closed and the spring 144 is thereafter compressed as the brake lever is further advanced. The spring 144 is made strong enough to close the valve 84 without compressing, that is, it must be strong enough to resist the pressure in the opposite direction offered by the train through the segments 50 and 108 because with these segments enmeshed there can be no assistance from the throttle spring 130.

It is thus seen that the brake can be applied as usual, the power being first cut off. If an increased speed over that determined by the governor unit is required, as in passing a car on the road, the carbureter valve is further opened by the hand throttle 92 the pull of the governor being overcome by force exerted at the throttle, which is held open by hand until the predetermined rate of speed is again desired when the throttle lever is returned to its zero position.

The operation of the novel mechanism having been set forth during the course of the foregoing description it need only be said that having balanced the governor unit at the rate of speed which the driver desires to maintain, and having enmeshed the gear segments, the supply of gas then remains constant until some condition causes the engine to run either faster or slower. If the engine speeds up the governor weights 58 will move outward from their balanced position as illustrated by Fig. 4, and the power thus generated acts through the rod 38 to turn the bell-crank arm 46 rearwardly which causes the valve rod 96 to move upward and thus partially close the valve 84. If the engine slows down then the governor weights 58 will fall inward and the power stored in the shaft spring 52 will cause the rod 38 to follow the governor nubs 60 as they move to the right in Fig. 4. Consequently the bell-crank arm 46 is turned forwardly, the movement of the valve rod 96 is downward and the opening of the valve 84 is increased. In either case when the previous condition of travel is again restored the governor unit resumes its position of balance ready to instantly control and correct any condition that tends to throw the unit out of balance to either side. The two segment-carrying bell-cranks are so proportioned that any movement at the end of arm 46 is doubled at the end of arm 104, rendering the mechanism extremely sensitive when hooked-in.

Whenever the button 124 is pushed in to the dash (as in Fig. 7), the gear segments 50 and 108 are separated, thus disconnecting the governor unit from its control of the carbureter valve 84, and the throttle spring 130 is simultaneously released to move the bell-crank arm 104 in direction and extent to fully close the valve if the throttle lever 92 is in its zero position. The throttle spring 130 permits the car to be driven with the throttle lever 92 in the usual way whenever the button 124 is against the dash since this spring is not strong enough to overcome the frictional engagement of the throttle lever on its segment 94. An important advantage derived from the use of this invention is that the car in which it is installed need not be provided with an accelerator because after hooking-in the only use for the feet is for control of the car through the clutch and brake levers. The discomfort experienced from a steady pressure on the accelerator, when driving by this method on long runs, is wholly eliminated. The driver may sit at ease for long periods of time, particularly while on tour, without the necessity of using any foot control.

It will be observed that on releasing the brake lever, after the gas supply has been reduced and the car slowed down by partially advancing that lever, the car is at once returned to the control of the balanced governor unit because the operation of the brake lever cannot disconnect the gear segments 50 and 108 that act to connect the two trains of the mechanism and thus establish a control of the gas supply from a variation in the position of the governor weights from their balanced position. Consequently the car immediately picks up its speed to that originally established.

It will be understood that in the appended claims the term "fuel" is used as defining any power agent and is not limited to the fuel required for an internal combustion engine.

Having thus indicated the scope of the invention and having described one embodiment for carrying the invention into effect, what is claimed as new, is:—

1. Speed control mechanism for engine driven motor vehicles comprising, in combination, a shaft driven from the engine, governor weights rotating with said shaft, a member arranged to be moved by said weights to different positions depending upon the position of the governor weights at different speeds of said shaft, a spring acting on said member in opposition to the force exerted thereon by said weights, said spring being adjustable to balance said weights at a given operating position of them, a throttle valve for the engine, and means under the control of the driver and independent of said member for opening said valve to a degree serving to bring said governor weights to said known position and for then placing said valve under the control of said movable member.

2. Speed control mechanism for engine driven motor vehicles comprising, in combination, a mechanism driven by the engine at a speed proportional to the engine speed and including a member arranged to be moved in one direction as the engine speed increases and to an extent depending upon the engine speed, and a spring tending to move said member in the opposite direction, a device adjustable to control the engine speed, and connections between said device and said mechanism for causing said mechanism to control the engine speed automatically, said connections including elements arranged to be operatively connected or disconnected by the driver while driving the vehicle.

3. Speed control mechanism for engine driven motor vehicles comprising, in combination, a mechanism driven by the engine at a speed proportional to the engine speed and including a member arranged to be moved in one direction as the engine speed increases and to an extent depending upon the engine speed, and a spring tending to move said member in the opposite direction, a device adjustable to control the engine speed, connections between said device and said mechanism for causing said mechanism to control the engine speed automatically, and means under control of the driver for rendering said connections operative or inoperative at will while the vehicle is being driven in a normal manner.

4. Speed control mechanism for engine driven motor vehicles comprising, in combination, a mechanism driven by the engine at a speed proportional to the engine speed and including a member arranged to be moved in one direction as the engine speed increases and to an extent depending upon the engine speed, and a spring tending to move said member in the opposite direction, a throttle valve for controlling the engine speed, and connections between said valve and said mechanism for causing said mechanism to open or close said valve automatically in response to changes in the engine speed to maintain said speed substantially constant, said connections including elements arranged to be operatively disconnected by the driver and connected again in a different relationship while the vehicle is being driven in a normal manner.

5. Speed control mechanism for engine driven motor vehicles comprising, in combination, a centrifugal governor unit driven by the engine at a speed proportional to the engine speed and including governor weights and a spring opposing the centrifugal action of the weights, means operable by the driver while driving the vehicle for adjusting the tension of said spring to balance said weights at a known position of them, an indicator operating as the spring is adjusted for showing variations in the operating position of said weights, a throttle valve for the engine, and means, normally disconnected but connectable by the operator, to be controlled by said governor unit for governing the action of said valve to cause it to maintain said speed substantially constant.

6. Speed control mechanism for engine driven motor vehicles comprising, in combination, a mechanism driven by the engine at a speed proportional to the engine speed and including a member arranged to be moved in one direction as the engine speed increases and to an extent depending upon the engine speed, and a spring tending to move said member in the opposite direction, a throttle valve for the engine, connections between said valve and said mechanism for causing said mechanism to control the engine speed automatically, said connections including two toothed segments mounted for relative movement into or out of mesh with each other, and means under the control of the driver for moving said segments into or out of mesh.

7. Speed control mechanism for engines comprising, in combination, a throttle valve, yielding means operating normally to close said valve, a throttle lever connected with said valve to open it, but unable to close it, a centrifugal governor unit driven by the engine and including a member movable in unison with variations in engine speed, additional operating mechanism for said valve and means for operatively connecting said movable member with said valve operating mechanism, and simultaneously throwing said yielding valve closing means out of action.

8. Speed control mechanism for engines comprising, in combination, a throttle valve, yielding means operating normally to close said valve, a throttle lever connected with said valve to open it, but unable to close it, a centrifugal governor unit driven by the engine and including a member movable in unison with variations in engine speed, additional operating mechanism for said valve, means for operatively connecting said movable member with said valve operating mechanism and simultaneously throwing said yielding valve closing means out of action, a brake lever, and mechanism for connecting said brake lever with said valve and operative to close the valve during a first idle portion of the lever movement in applying the brake and then to yield during the continued movement of said lever.

9. Speed control mechanism having, in combination, a throttle valve, valve operating mechanism, yielding means operating normally to close said valve, a throttle lever connected to open said valve but without power to close it, means for disconnecting said valve closing means after the valve has been opened by the throttle lever and for placing the valve under the control of mechanism operative automatically to maintain the same degree of opening while the load on the engine remains uniform and to increase or decrease the degree of opening as the load respectively increases or decreases, and means permitting withdrawal of said throttle lever connection to free the valve of restraint while its action is governed by said last named mechanism.

10. Speed control mechanism for engine driven motor vehicles comprising, in combination, an automatic governor unit driven by the engine, means under the control of the driver for placing the fuel supply under the control of said unit when a predetermined rate of speed has been attained, a throttle valve for the engine, a throttle lever connected with said valve and through which the fuel supply to the engine may be manually increased, and operative connections to the brake lever of the vehicle by which the fuel supply may be decreased through the operation of the brake, all without disconnecting said governor unit from the fuel supply.

11. Speed control mechanism for engine driven motor vehicles comprising, in combination, a centrifugal governor unit driven by the engine at a speed proportional to the engine speed and including governor weights and a spring opposing the centrifugal action of the weight, means operable by the driver while driving the vehicle for adjusting the tension of said spring to balance said weights at a known position of them, an indicator for showing variations in the operating position of said weights, a throttle valve, means for connecting said unit with said valve to cause the unit to automatically operate said valve to control the speed of the engine, and independent means operable at all speeds for manually adjusting said valve while still connected to said governor unit.

12. Speed control mechanism for engines comprising, in combination, a throttle valve, a valve-operating train of mechanism, a device acting through said train normally to hold said valve closed, a centrifugal governor unit driven by the engine and including governor weights and means for balancing the action of said weights to retain them in a given position for a predetermined speed of the engine, means for opening said valve against the force of said valve closing device, and means for operatively connecting said train of mechanism to said governor unit, and simultaneously rendering said valve closing device inoperative, whereby the balancing of said weights is preserved under the new condition.

13. Speed control mechanism for engine driven motor vehicles comprising, in combination, a centrifugal governor unit driven by the engine at a speed proportional to the engine speed and including governor weights and a spring opposing the centrifugal action of the weights, means operable by the driver while driving the vehicle for adjusting the tension of said spring, a throttle valve for controlling the engine speed, connections between said valve and said unit for causing said unit to open or close said valve automatically in response to changes in the engine speed and to maintain said speed substantially constant, said connections including elements arranged to be operatively connected or disconnected by the driver while the vehicle is being driven in a normal manner, and manually operable connections permitting the driver to assume control of said throttle valve at will independently of the action of said governor unit.

14. Speed control mechanism for engine driven motor vehicles comprising, in combination, a centrifugal governor unit driven at a speed proportional to the desired engine speed and including governor weights and a spring opposing the centrifugal action of the weights, means operable by the driver while driving the vehicle for varying the load on the governor to change its speed, a throttle valve for controlling the engine speed, connections between said valve and said unit for causing said unit to open or close said valve automatically in response to changes in the engine speed and to maintain said speed substantially constant, said connections including elements arranged to be operatively connected in different relative positions by the driver while the vehicle is being driven in a normal manner, and manually operable connections permitting the driver to assume control of said throttle valve at will independently of the action of said governor unit.

ERASTUS E. WINKLEY.